(12) United States Patent
Khadar et al.

(10) Patent No.: US 12,547,993 B2
(45) Date of Patent: Feb. 10, 2026

(54) SYSTEM, METHOD, AND COMPUTER PROGRAM PRODUCT FOR MANAGING OPERATION OF A REMOTE TERMINAL

(71) Applicant: Visa International Service Association, San Francisco, CA (US)

(72) Inventors: Habeeb Shaik Khadar, Chittoor (IN); Vinod Kumar Pinniboyina, Bangaluru (IN); Mohan Babu Nellore, Bangaluru (IN)

(73) Assignee: Visa International Service Association, San Francisco, CA (US)

( * ) Notice: Subject to any disclaimer, the term of this patent is extended or adjusted under 35 U.S.C. 154(b) by 153 days.

(21) Appl. No.: 17/729,540

(22) Filed: Apr. 26, 2022

(65) Prior Publication Data

US 2023/0342736 A1    Oct. 26, 2023

(51) Int. Cl.
*G06Q 20/08* (2012.01)
*G06Q 20/20* (2012.01)
*G06Q 20/40* (2012.01)

(52) U.S. Cl.
CPC ........... *G06Q 20/085* (2013.01); *G06Q 20/20* (2013.01); *G06Q 20/4014* (2013.01)

(58) Field of Classification Search
None
See application file for complete search history.

(56) References Cited

U.S. PATENT DOCUMENTS

| | | | |
|---|---|---|---|
| 8,792,861 B2* | 7/2014 | Drzyzga | G06Q 20/4018 455/410 |
| 10,049,349 B1* | 8/2018 | Grassadonia | G06Q 20/40 |
| 10,373,144 B1* | 8/2019 | Botros | G07G 1/14 |
| 10,592,884 B2* | 3/2020 | Wieler | G06Q 20/22 |
| 11,620,639 B2* | 4/2023 | Spector | G06Q 30/0207 705/64 |
| 2009/0119190 A1* | 5/2009 | Realini | G06Q 20/3265 705/37 |

(Continued)

FOREIGN PATENT DOCUMENTS

| | | | | |
|---|---|---|---|---|
| AU | 2019361900 A1 * | 5/2021 | | G06Q 20/407 |
| WO | WO-2016057608 A1 * | 4/2016 | | G06Q 20/4012 |

*Primary Examiner* — Neha Patel
*Assistant Examiner* — Jahed Ali
(74) *Attorney, Agent, or Firm* — The Webb Law Firm

(57) ABSTRACT

Methods are provided for conducting a transaction involving a remote point-of-sale (POS) device that include receiving a transaction request message from a remote payment entity system, wherein the transaction request message is associated with a transaction involving a merchant system, the merchant system is located remote from the remote payment entity system, and the transaction request message includes an identifier of the merchant system, an identifier of the remote payment entity system, and transaction data associated with the transaction; processing the transaction based on the transaction request message by communicating with an acquirer system corresponding to the merchant system; and transmitting, with the at least one processor, at least one transaction confirmation message to the merchant system and the remote payment entity in response to receiving a transaction authorization response message from the acquirer system. Systems and computer program products are also disclosed.

17 Claims, 6 Drawing Sheets

(56) References Cited

U.S. PATENT DOCUMENTS

| | | | |
|---|---|---|---|
| 2009/0240627 A1* | 9/2009 | Rodriguez | H04L 9/321 |
| | | | 705/76 |
| 2010/0169214 A1* | 7/2010 | Nonni | G07G 1/0036 |
| | | | 705/44 |
| 2012/0011067 A1* | 1/2012 | Katzin | G06Q 20/40 |
| | | | 709/219 |
| 2013/0226722 A1* | 8/2013 | Barrera | G06Q 30/06 |
| | | | 705/21 |
| 2016/0155112 A1* | 6/2016 | Phillips | G06Q 20/3276 |
| | | | 235/379 |
| 2018/0082284 A1* | 3/2018 | Gomes | G06Q 20/405 |
| 2018/0150821 A1* | 5/2018 | Wieler | G06Q 20/22 |
| 2018/0253705 A1* | 9/2018 | Spector | G06Q 20/326 |
| 2018/0285853 A1* | 10/2018 | Kieffer | G06Q 20/00 |
| 2019/0057380 A1* | 2/2019 | Florinis | G06Q 20/405 |
| 2019/0228408 A1* | 7/2019 | Singh | G06Q 20/3274 |
| 2019/0228417 A1* | 7/2019 | Modi | G06Q 20/40145 |
| 2020/0341783 A1* | 10/2020 | Kurien | G06Q 30/04 |
| 2021/0117968 A1* | 4/2021 | Bhasin | G06Q 20/20 |
| 2021/0209592 A1* | 7/2021 | Garg | G06Q 20/0855 |
| 2021/0233060 A1* | 7/2021 | Koeppel | G06Q 20/204 |
| 2021/0312542 A1* | 10/2021 | Shihab | G06Q 20/405 |
| 2021/0326843 A1* | 10/2021 | Metral | G06Q 20/4033 |
| 2022/0051237 A1* | 2/2022 | Karpenko | G06Q 20/3227 |
| 2022/0067739 A1* | 3/2022 | Sukhija | G06Q 20/409 |
| 2022/0156746 A1* | 5/2022 | Kledaras | G06Q 20/407 |
| 2022/0270095 A1* | 8/2022 | Modi | G06Q 40/02 |
| 2023/0137574 A1* | 5/2023 | Marx | G06Q 20/322 |
| | | | 705/39 |
| 2024/0193594 A1* | 6/2024 | Mu | G06Q 20/382 |

\* cited by examiner

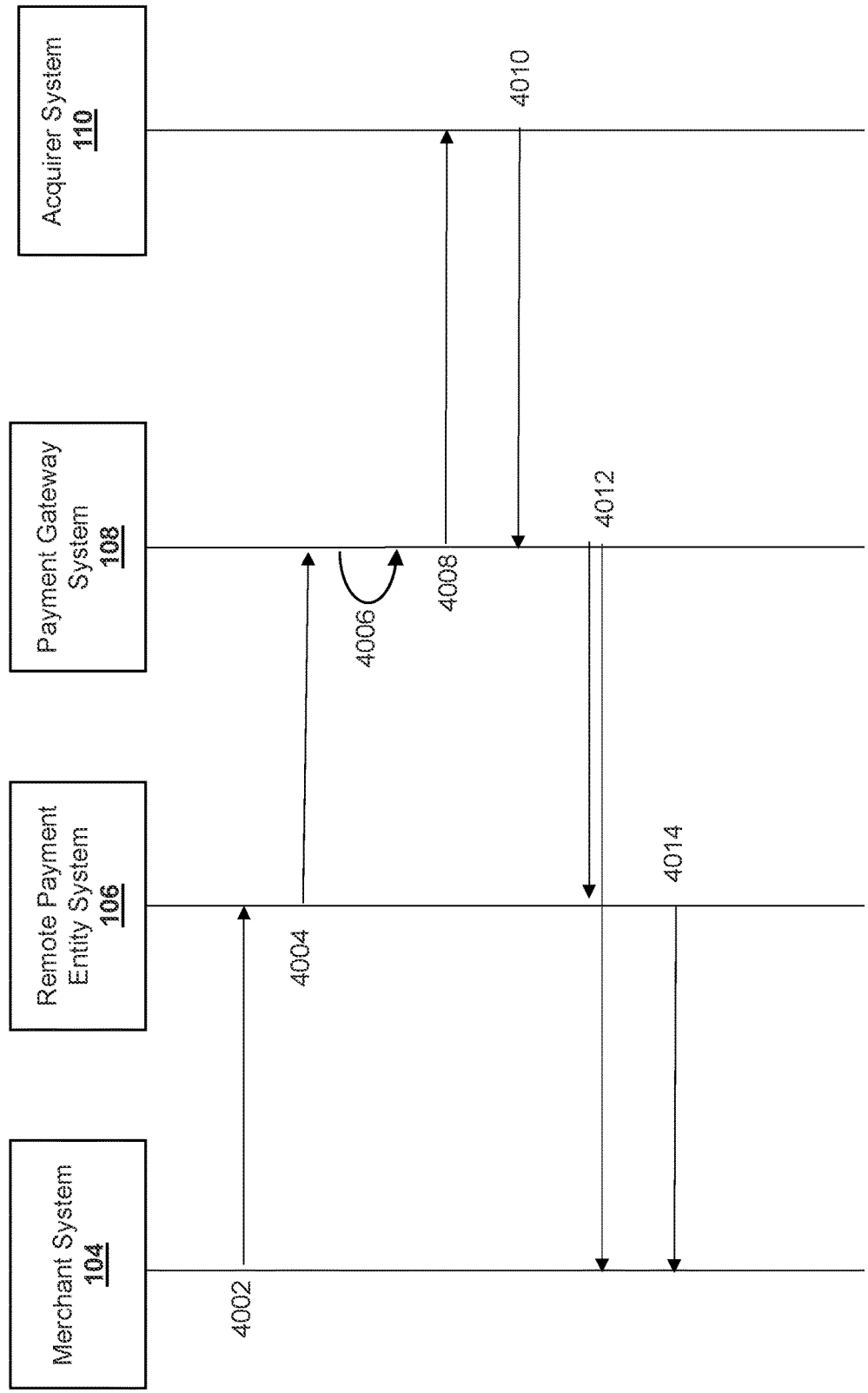

SYSTEM, METHOD, AND COMPUTER PROGRAM PRODUCT FOR MANAGING OPERATION OF A REMOTE TERMINAL

BACKGROUND

1. Field

This disclosure relates generally to operating a point of sale device and, in non-limiting embodiments, systems, methods, and computer program products for conducting a transaction involving a remote point of sale device, such as a payment terminal.

2. Technical Considerations

A payment terminal (e.g., a point of sale (POS) device, a credit card terminal, electronic funds transfer POS (EFT-POS) terminal, process data quickly (PDQ) terminal, and/or the like) may be a device which interfaces with payment cards to make electronic funds transfers. The payment terminal may include of a secure keypad, such as a personal identification number (PIN) pad, for entering PIN, a screen, a means of capturing information from payments cards and a network connection to access a payment network (e.g., a transaction processing network) for authorization.

In some instances, a payment terminal may allow a merchant to capture credit and/or debit card information and to transmit this information to a merchant bank (e.g., an acquirer) for authorization and finally, to transfer funds to the merchant. The terminal may allow a merchant or a customer to swipe, insert, and/or hold a card near the payment terminal to capture the credit and/or debit card information. In some instances, a payment terminal may be used in a stand-alone mode, where the merchant enters a transaction amount for a payment transaction into the payment terminal before the customer present their card and PIN.

However, in a situation where a payment terminal malfunctions, a customer may not be able to conduct a payment transaction. For example, it may not be possible to initiate a payment transaction where communication between a merchant (e.g., a merchant system of a merchant) and a transaction processing network is unable to be carried out. In some instances, the payment transaction may not be initiated in situations where a payment terminal of the merchant malfunctions and is unable to communicate with the transaction processing network.

SUMMARY

Accordingly, disclosed are systems, methods, and computer program products for conducting a transaction involving a remote point of sale device that overcome some or all of the deficiencies of the prior art.

According to non-limiting embodiments or aspects, provided is a method for managing operation of a remote terminal. The method may include receiving, with at least one processor, a transaction request message from a remote payment entity system, wherein the transaction request message is associated with a transaction involving a merchant system, wherein the merchant system is located remote from the remote payment entity system, the transaction request message including an identifier of the merchant system, an identifier of the remote payment entity system, and transaction data associated with the transaction; processing, with the at least one processor, the transaction based on the transaction request message by communicating with an acquirer system corresponding to the merchant system; and in response to receiving a transaction authorization response message from the acquirer system, transmitting, with the at least one processor, at least one transaction confirmation message to the merchant system and the remote payment entity.

According to non-limiting embodiments or aspects, the method may additionally comprise: receiving, with the at least one processor, a first transaction request message comprising the identifier of the merchant system; receiving, with the at least one processor, a second transaction request message comprising the identifier of the remote payment entity system and identifier of the merchant system; transmitting, with the at least one processor, a first transaction authorization request message to the acquirer system; and transmitting, with the at least one processor, a second transaction authorization request message to a second acquirer system, wherein the second transaction request message further comprises a service fee data associated with a service fee, wherein the transaction authorization response message comprises a first transaction authorization response message associated with the merchant system and a second transaction authorization response message associated with the remote payment entity system.

According to non-limiting embodiments or aspects, the method may further comprise: receiving, with a user device, the transaction data associated with the transaction and identifier of the merchant system from the merchant system, transmitting, with the user device, the transaction data associated with the transaction and identifier of the merchant system to a second user device; and generating, with the remote payment entity system, the transaction request message, in response to receiving the transaction data associated with the transaction and identifier of the merchant system from the second user device, wherein the transaction data associated with the transaction and the identifier of the merchant system are encoded as a machine-readable code, and wherein the machine-readable code is generated by the merchant system and communicated by the user device to the second user device.

According to non-limiting embodiments or aspects, wherein the transaction request message may further comprise a remote payment identifier, processing the transaction may further comprise: determining that the transaction is a remote payment transaction based on the remote payment identifier; and determining whether to transmit the transaction request message to the acquirer system or a second acquirer system based on the identifier of the merchant system, in response to determining that the transaction is a remote payment transaction.

According to non-limiting embodiments or aspects, provided is a system comprising: at least one processor in communication with the at least one data storage device and an electronic payment processing network, the at least one processor may be programmed or configured to: receive a transaction request message from a remote payment entity system, wherein the transaction request message is associated with a transaction involving a merchant system, wherein the merchant system is located remote from the remote payment entity system, the transaction request message including an identifier of the merchant system, an identifier of the remote payment entity system, and transaction data associated with the transaction; process the transaction based on the transaction request message by communicating with an acquirer system corresponding to the merchant system; and transmit at least one transaction confirmation message to the merchant system and the remote payment entity, in response to receiving a transaction authorization response message from the acquirer system.

According to non-limiting embodiments or aspects, the system may further comprise: at least one data storage device comprising a database including a plurality of identifiers corresponding to a plurality of merchant systems, each identifier of the plurality of identifiers associated with at least one acquirer system.

According to non-limiting embodiments or aspects, the system having the at least one processor may be programmed or configured to process the transaction request message to: receive a first transaction request message comprising the identifier of the merchant system; and receive a second transaction request message comprising the identifier of the remote payment entity system and identifier of the merchant system.

According to non-limiting embodiments or aspects, the system having the at least one processor may be programmed or configured to: transmit a first transaction authorization request message to the acquirer system; and transmit a second transaction authorization request message to a second acquirer system, wherein the second transaction request message further comprises a service fee data associated with a service fee, wherein the transaction authorization response message comprises a first transaction authorization response message associated with the merchant system and a second transaction authorization response message associated with the remote payment entity system.

According to non-limiting embodiments or aspects, the system having the at least one processor may be programmed or configured to: receive, with a user device, the transaction data associated with the transaction and identifier of the merchant system from the merchant system; transmit, with the user device, the transaction data associated with the transaction and identifier of the merchant system to a second user device; and generate, with the remote payment entity, system, the transaction request message, in response to receiving the transaction data associated with the transaction and identifier of the merchant system from the second user device, wherein the transaction data associated with the transaction and the identifier of the merchant system are encoded as a machine-readable code, and wherein the machine-readable code is generated by the merchant system and communicated by the user device to the second user device.

According to non-limiting embodiments or aspects, the system, wherein the transaction request message may further comprise a remote payment identifier, the at least one processor may be further programmed or configured to: determine that the transaction is a remote payment transaction based on the remote payment identifier; and determine whether to transmit the transaction request message to the acquirer system or a second acquirer system with based on the identifier of the merchant system, in response to determining that the transaction is a remote payment transaction.

According to non-limiting embodiments or aspects, provided is a computer program product comprising at least one non-transitory computer-readable medium including program instructions that, when executed by at least one processor, may cause the at least one processor to: receive a transaction request message from a remote payment entity system, wherein the transaction request message is associated with a transaction involving a merchant system, wherein the merchant system is located remote from the remote payment entity system, the transaction request message including an identifier of the merchant system, an identifier of the remote payment entity system, and transaction data associated with the transaction; process the transaction based on the transaction request message by communicating with an acquirer system corresponding to the merchant system; and transmit at least one transaction confirmation message to the merchant system and the remote payment entity system, in response to receiving a transaction authorization response message from the acquirer system.

According to non-limiting embodiments or aspects, the computer program product may further cause the at least one processor to: generate a first transaction request message comprising the identifier of the merchant system; generate a second transaction request message comprising the identifier of the remote payment entity system; transmit a first transaction authorization request message to the acquirer system; and transmit a second transaction authorization request message to a second acquirer system.

Other non-limiting embodiments or aspects will be set forth in the following numbered clauses:

Clause 1: A method comprising: receiving, with at least one processor, a transaction request message from a remote payment entity system, wherein the transaction request message is associated with a transaction involving a merchant system, wherein the merchant system is located remote from the remote payment entity system, the transaction request message including an identifier of the merchant system, an identifier of the remote payment entity system, and transaction data associated with the transaction; processing, with the at least one processor, the transaction based on the transaction request message by communicating with an acquirer system corresponding to the merchant system; and in response to receiving a transaction authorization response message from the acquirer system, transmitting, with the at least one processor, at least one transaction confirmation message to the merchant system and the remote payment entity.

Clause 2: The method of clause 1 further comprising: receiving, with the at least one processor, a first transaction request message comprising the identifier of the merchant system; and receiving, with the at least one processor, a second transaction request message comprising the identifier of the remote payment entity system.

Clause 3: The method of clauses 1 or 2, wherein processing the transaction request message further comprises: transmitting, with the at least one processor, a first transaction authorization request message to the acquirer system; and transmitting, with the at least one processor, a second transaction authorization request message to a second acquirer system.

Clause 4: The method of any of clauses 1-3, wherein the second transaction request message further comprises a service fee data associated with a service fee.

Clause 5: The method of any of clauses 1-4, wherein the transaction authorization response message comprises a first transaction authorization response message associated with the merchant system and a second transaction authorization response message associated with the remote payment entity system.

Clause 6: The method of any of clauses 1-5, further comprising: receiving, with a user device, the transaction data associated with the transaction and identifier of the merchant system from the merchant system, transmitting, with the user device, the transaction data associated with the transaction and identifier of the merchant system to a second user device; and generating, with the remote payment entity system, the transaction request message, in response to receiving the transaction data associated with the transaction and identifier of the merchant system from the second user device.

Clause 7: The method of any of clauses 1-6, wherein the transaction data associated with the transaction and the identifier of the merchant system are encoded as a machine-readable code, and wherein the machine-readable code is generated by the merchant system and communicated by the user device to the second user device.

Clause 8: The method of any of clauses 1-7, wherein the transaction request message further comprises a remote payment identifier, and wherein processing the transaction comprises: determining that the transaction is a remote payment transaction based on the remote payment identifier; and determining whether to transmit the transaction request message to the acquirer system or a second acquirer system based on the identifier of the merchant system, in response to determining that the transaction is a remote payment transaction.

Clause 9: A system comprising: at least one processor in communication with at least one data storage device and an electronic payment processing network, the at least one processor programmed or configured to: receive a transaction request message from a remote payment entity system, wherein the transaction request message is associated with a transaction involving a merchant system, wherein the merchant system is located remote from the remote payment entity system, the transaction request message including an identifier of the merchant system, an identifier of the remote payment entity system, and transaction data associated with the transaction; process the transaction based on the transaction request message by communicating with an acquirer system corresponding to the merchant system; and transmit at least one transaction confirmation message to the merchant system and the remote payment entity, in response to receiving a transaction authorization response message from the acquirer system.

Clause 10: The system of clause 9, further comprising: at least one data storage device comprising a database including a plurality of identifiers corresponding to a plurality of merchant systems, each identifier of the plurality of identifiers associated with at least one acquirer system.

Clause 11: The system of clauses 9 or 10, the at least one processor programmed or configured to process the transaction request message: receive a first transaction request message comprising the identifier of the merchant system; and receive a second transaction request message comprising the identifier of the remote payment entity system.

Clause 12: The system of any of clauses 9-11, the at least one processor programmed or configured to: transmit a first transaction authorization request message to the acquirer system; and transmit a second transaction authorization request message to a second acquirer system.

Clause 13: The system of any of clauses 9-12, wherein the second transaction request message further comprises a service fee data associated with a service fee.

Clause 14: The system of any of clauses 9-13, wherein the transaction authorization response message comprises a first transaction authorization response message associated with the merchant system and a second transaction authorization response message associated with the remote payment entity system.

Clause 15: The system of any of clauses 9-14, the at least one processor programmed or configured to: receive, with a user device, the transaction data associated with the transaction and identifier of the merchant system from the merchant system; transmit, with the user device, the transaction data associated with the transaction and identifier of the merchant system to a second user device; and generate, with the remote payment entity, system, the transaction request message, in response to receiving the transaction data associated with the transaction and identifier of the merchant system from the second user device.

Clause 16: The system of any of clauses 9-15, wherein the transaction data associated with the transaction and the identifier of the merchant system are encoded as a machine-readable code, and wherein the machine-readable code is generated by the merchant system and communicated by the user device to the second user device.

Clause 17: The system of any of clauses 9-16, wherein the transaction request message further comprises a remote payment identifier, and wherein the at least one processor is further programmed or configured to: determine that the transaction is a remote payment transaction based on the remote payment identifier; and determine whether to transmit the transaction request message to the acquirer system or to a second acquirer system based on the identifier of the merchant system, in response to determining that the transaction is a remote payment transaction.

Clause 18: A computer program product comprising at least one non-transitory computer-readable medium including program instructions that, when executed by at least one processor, cause the at least one processor to: receive a transaction request message from a remote payment entity system, wherein the transaction request message is associated with a transaction involving a merchant system, wherein the merchant system is located remote from the remote payment entity system, the transaction request message including an identifier of the merchant system, an identifier of the remote payment entity system, and transaction data associated with the transaction; process the transaction based on the transaction request message by communicating with an acquirer system corresponding to the merchant system; and transmit at least one transaction confirmation message to the merchant system and the remote payment entity system, in response to receiving a transaction authorization response message from the acquirer system.

Clause 19: The computer program product of clause 18, further causing the at least one processor to: generate a first transaction request message comprising the identifier of the merchant system; and generate a second transaction request message comprising the identifier of the remote payment entity system.

Clause 20: The computer program product of clauses 18 or 19, further causing the at least one processor to: transmit a first transaction authorization request message to the acquirer system; and transmit a second transaction authorization request message to a second acquirer system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIG. 4 is a diagram of an implementation of a non-limiting embodiment or aspect of a process for a transaction involving a remote payment entity system.

DESCRIPTION

Figure 1A:
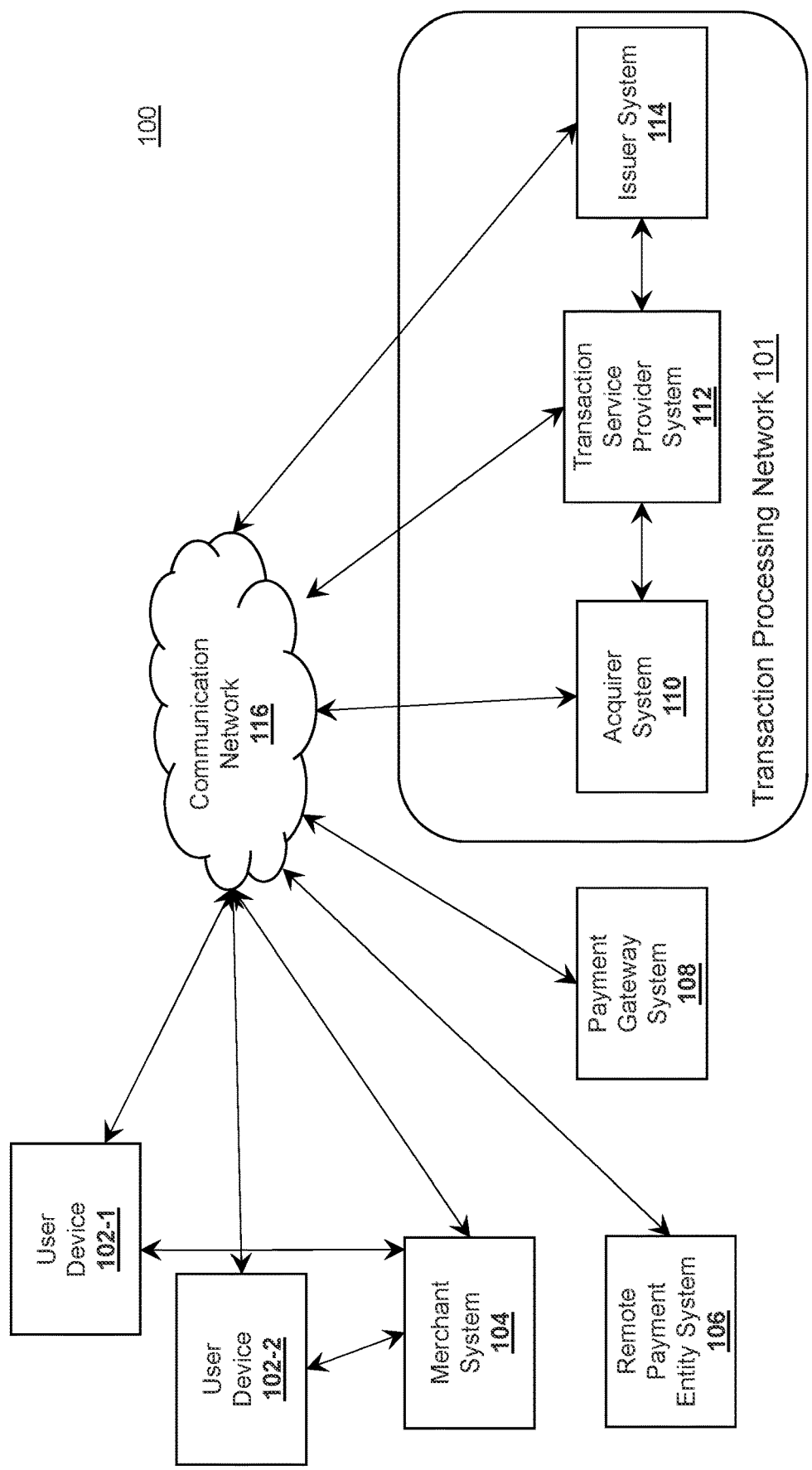
FIG. 1A is a diagram of a non-limiting embodiment of an environment in which methods, systems, and/or computer program products, described herein, may be implemented, according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, such as a payment terminal, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices (e.g., one or more POS devices) and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/ or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as, the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to methods, systems, and computer program products for operating a remote terminal. For example, the present disclosure provides a system that is programmed or configured to receive a transaction request message from a remote payment entity system, where the transaction request message is associated with a transaction involving a merchant system, the merchant system is located remote from the remote payment entity system, and the transaction request message includes an identifier of the merchant terminal, an identifier of the remote payment entity system, and data associated with the transaction. In some non-limiting embodiments, the system is programmed or configured to process the transaction based on the transaction request message by communicating with an acquirer system that corresponds to the merchant system and to transmit at least one transaction confirmation message to the first merchant terminal and the remote payment entity in response to receiving an authorization response message from the acquirer system.

In some non-limiting embodiments, the system is programmed or configured to receive a first transaction request message comprising the identifier of the merchant system and receive a second transaction request message comprising the identifier of the remote payment entity system. In some non-limiting embodiments, the system is programmed or configured to process the transaction request message by transmitting a first transaction authorization request message to the acquirer system and transmitting a second transaction authorization request message to a second acquirer system. In some non-limiting embodiments, the second transaction request message further comprises a service fee data associated with a service fee. In some non-limiting embodiments, the transaction authorization response message comprises a first transaction authorization response message associated with the merchant system and a second transaction authorization response message associated with the remote payment entity system.

In some non-limiting embodiments, the system is programmed or configured to receive, with a user device, the transaction data associated with the transaction and identifier of the merchant system from the merchant system and to transmit, with the user device, the transaction data associated with the transaction and identifier of the merchant system to a second user device, and generate, with the remote payment entity system, the transaction request message in response to receiving the transaction data associated with the transaction and identifier of the merchant system from the second user device. In some non-limiting embodiments, the transaction data associated with the transaction and the identifier of the merchant system are encoded as a machine-readable code, wherein the machine-readable code is generated by the merchant system and communicated by the user device to the second user device. In some non-limiting embodiments, the transaction request message further comprises a remote payment identifier, and the system is programmed or configured to process the transaction by determining that the transaction is a remote payment transaction based on the remote payment identifier and determining whether to transmit the transaction request message to the acquirer system or a second acquirer system based on the identifier of the merchant system in response to determining that the transaction is a remote payment transaction.

In this way, non-limiting embodiments or aspects of the present disclosure allow for a payment transaction between a consumer and a merchant to be conducted where a component of a merchant system associated with the merchant, such as a POS device of a merchant system, malfunctions. For example, it may be possible to initiate a payment transaction where communication between the POS device of the merchant system and a transaction processing network is unable to be carried out based on the use of a remote payment entity system that is remote from the POS device. Furthermore, by using a transaction request message that includes an identifier of the merchant terminal, an identifier of the remote payment entity system, the system provides for the ability of identifying the merchant Referring now to FIG. 1A, FIG. 1A is a diagram of a non-limiting embodiment of an example environment 100 in which devices, systems, methods, and/or products described herein may be implemented. As shown in FIG. 1A, environment 100 includes transaction processing network 101, user device 102-1, user device 102-2 (referred individually as user device 102 and collectively as user devices 102, where appropriate), merchant system 104, payment gateway system 108, acquirer system 110, transaction service provider system 112, issuer system 114, and/or remote payment entity system 106. User device 102, merchant system 104, payment gateway system 108, acquirer system 110, transaction service provider system 112, issuer system 114, and/or remote payment entity system 106 may interconnect (e.g., establish a connection to communicate and/or the like) via wired connections, wireless connections, or a combination of wired and wireless connections.

Transaction processing network 101 may include a plurality of systems in a communication path for processing a transaction (e.g., a payment transaction, such as a credit card transaction, a debit card transaction, etc.). As shown in FIG. 1A, transaction processing network 101 may include payment gateway system 108, acquirer system 110, transaction service provider system 112, and/or issuer system 114 in communication (e.g., via a communication path, via a communication channel, via a communication network, and/or the like) with each other. In some non-limiting embodiments or aspects, transaction processing network 101 may be involved with an electronic payment transaction that includes messages that are transmitted among user device 102, merchant system 104, payment gateway system 108, acquirer system 110, transaction service provider system 112, issuer system 114, and/or remote payment entity system 106.

User device 102-1 or user device 102-2 (e.g., referred to as user device 102, user device 102-1, second user device 102-2, or collectively as user devices 102, where appropriate) may include one or more devices capable of being in communication with merchant system 104, remote payment entity system 106, payment gateway system 108, acquirer system 110, transaction service provider system 112, and/or issuer system 114 via communication network 116. For example, user devices 102 may include one or more payment devices and/or one or more computing devices such as one or more mobile devices, one or more smartphones, one or more wearable devices (e.g., watches, glasses, lenses, clothing, and/or the like), one or more personal digital assistants (PDAs), one or more servers, and/or the like. In some non-limiting embodiments or aspects, user device 102 may communicate via a short-range wireless communication connection (e.g., a wireless communication connection for communicating information in a range between 2 to 3 centimeters to 5 to 6 meters, such as an NFC communication connection, an RFID communication connection, a Bluetooth® communication connection, and/or the like). For example, user device 102 may communicate with merchant system 104 via a short-range wireless communication connection. In some non-limiting embodiments or aspects, user device 102 may be associated with a user, as described herein. In some non-limiting embodiments or aspects, user device 102 may include an application associated with user device 102 (e.g., a client side application stored on user device 102, such as a mobile device application, a native application for a mobile device, a mobile cloud application for a mobile device, an electronic wallet application, a peer-to-peer payment transfer application, and/or the like). In some non-limiting embodiments or aspects, user device 102 may include remote payment entity system 106 or may be a component of remote payment entity system 106.

Merchant system 104 may include one or more devices capable of being in communication with user device 102, payment gateway system 108, acquirer system 110, transaction service provider system 112, and/or issuer system 114 via communication network 116. For example, merchant system 104 may include a computing device, such as a server, a group of servers, and/or other like devices. In some non-limiting embodiments or aspects, merchant system 104 may communicate via a short-range wireless communication connection. For example, merchant system 104 may communicate with user device 102 via a short-range wireless communication connection. In some non-limiting embodiments or aspects, merchant system 104 may be associated with one or more merchants, as described herein. In some non-limiting embodiments or aspects, merchant system 104 may include one or more POS devices. In some non-limiting embodiments or aspects, merchant system 104 may include an application associated with an application stored on user device 102 (e.g., a server side application associated with a client side application stored on user device 102, such as a mobile device application, a native application for a mobile device, a mobile cloud application for a mobile device, an electronic wallet application, a peer-to-peer payment transfer application, and/or the like). In some non-limiting embodiments or aspects, merchant system 104 may include remote payment entity system 106 or may be a component of remote payment entity system 106.

Remote payment entity system 106 may include one or more devices capable of being in communication with user device 102, merchant system 104, payment gateway system 108, acquirer system 110, transaction service provider system 112, and/or issuer system 114 via communication network 116. In some non-limiting embodiments, remote payment entity system 106 may include user device 102 or may be a component of user device 102. In some non-limiting embodiments, remote payment entity system 106 may include merchant system 104 or may be a component of merchant system 104. In some non-limiting embodiments or aspects, remote payment entity system 106 may include an application associated with an application stored on user device 102 (e.g., a server side application associated with a client side application stored on user device 102, such as a mobile device application, a native application for a mobile device, a mobile cloud application for a mobile device, an electronic wallet application, a peer-to-peer payment transfer application, and/or the like) and/or an application associated with an application stored on merchant system 104.

Payment gateway system 108 may include one or more devices capable of being in communication with user device 102, merchant system 104, remote payment entity system 106, acquirer system 110, transaction service provider system 112, and/or issuer system 114 via communication network 116. For example, payment gateway system 108 may include a server, a group of servers, and/or other like devices. In some non-limiting embodiments or aspects, payment gateway system 108 may be associated with a payment gateway as described herein.

Acquirer system 110 may include one or more devices capable of being in communication with user device 102, merchant system 104, remote payment entity system 106, payment gateway system 108, transaction service provider system 112, issuer system 114, and/or remote payment entity system 106 via communication network 116. For example, acquirer system 110 may include a server, a group of servers, and/or other like devices. In some non-limiting embodiments or aspects, acquirer system 110 may be associated with an acquirer as described herein.

Transaction service provider system 112 may include one or more devices capable of being in communication with user device 102, merchant system 104, remote payment entity system 106, payment gateway system 108, acquirer system 110, and/or issuer system 114 via communication network 116. For example, transaction service provider system 112 may include a server (e.g., a transaction processing server), a group of servers, and/or other like devices. In some non-limiting embodiments or aspects, transaction service provider system 112 may be associated with a transaction service provider as described herein.

Issuer system 114 may include one or more devices capable of being in communication with user device 102, merchant system 104, remote payment entity system 106, payment gateway system 108, acquirer system 110, and/or transaction service provider system 112 via communication network 116. For example, issuer system 114 may include a server, a group of servers, and/or other like devices. In some non-limiting embodiments or aspects, issuer system 114 may be associated with an issuer institution that issued a payment account and/or instrument (e.g., a credit account, a debit account, a credit card, a debit card, and/or the like) to a user (e.g., a user associated with user device 102 and/or the like).

Communication network 116 may include one or more wired and/or wireless networks. For example, communication network 116 may include a cellular network (e.g., a long-term evolution (LTE®) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1A are provided as an example. There may be additional systems and/or devices, fewer systems and/or devices, different systems and/or devices, or differently arranged systems and/or devices than those shown in FIG. 1A. Furthermore, two or more systems and/or devices shown in FIG. 1A may be implemented within a single system or a single device, or a single system or a single device shown in FIG. 1A may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 1B:
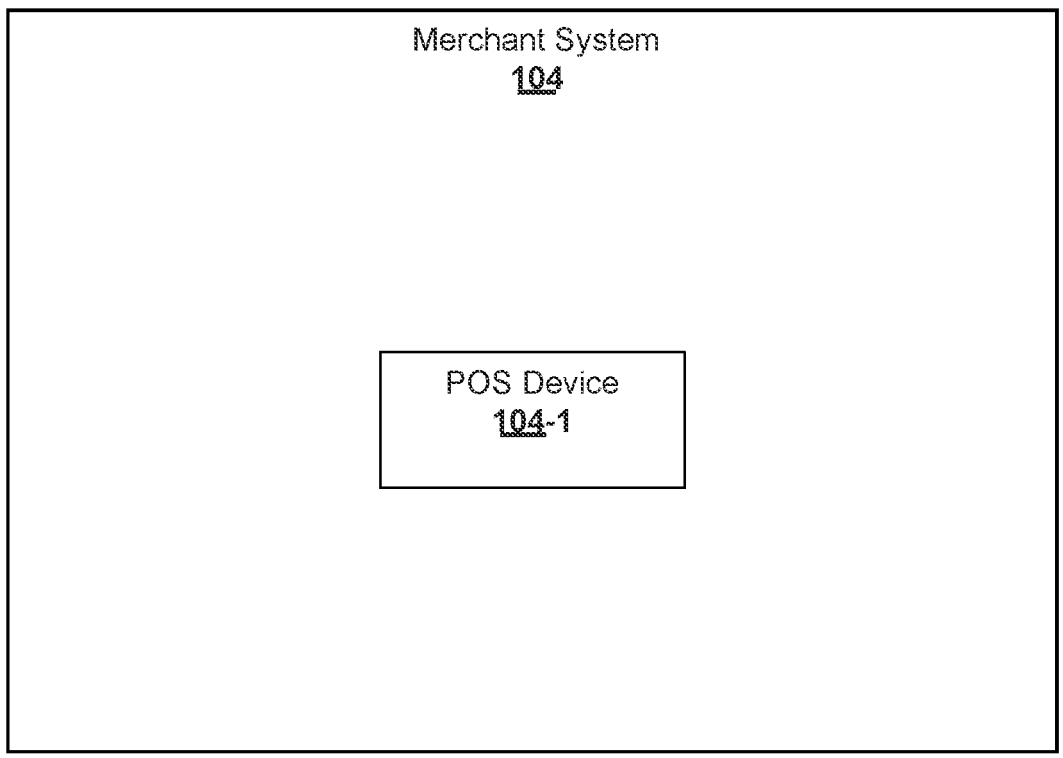
FIG. 1B is a diagram of a non-limiting embodiment or aspect of a merchant system.

Referring now to FIG. 1B, FIG. 1B is a diagram of a non-limiting embodiment or aspect of merchant system 104. For example, merchant system 104 may include at least one POS device 104-1 capable of being in communication with user device 102, payment gateway system 108, acquirer system 110, transaction service provider system 112, and/or issuer system 114 via communication network 116. For example, POS device 104-1 may communicate via a short-range wireless communication connection. For example, POS device 104-1 may communicate with user device 102 via a short-range wireless communication connection. In another example, POS device 104-1 may communicate with user device 102, may communicate via communication network 116, or communicate via an application associated with user device 102.

In some non-limiting embodiments or aspects, POS device 104-1 may be associated with one or more merchants, as described herein. For example, POS device 104-1 may include an application associated with an application stored on user device 102 (e.g., a server side application associated with a client side application stored on user device 102, such as a mobile device application, a native application for a mobile device, a mobile cloud application for a mobile device, an electronic wallet application, a peer-to-peer payment transfer application, and/or the like).

Figure 1C:
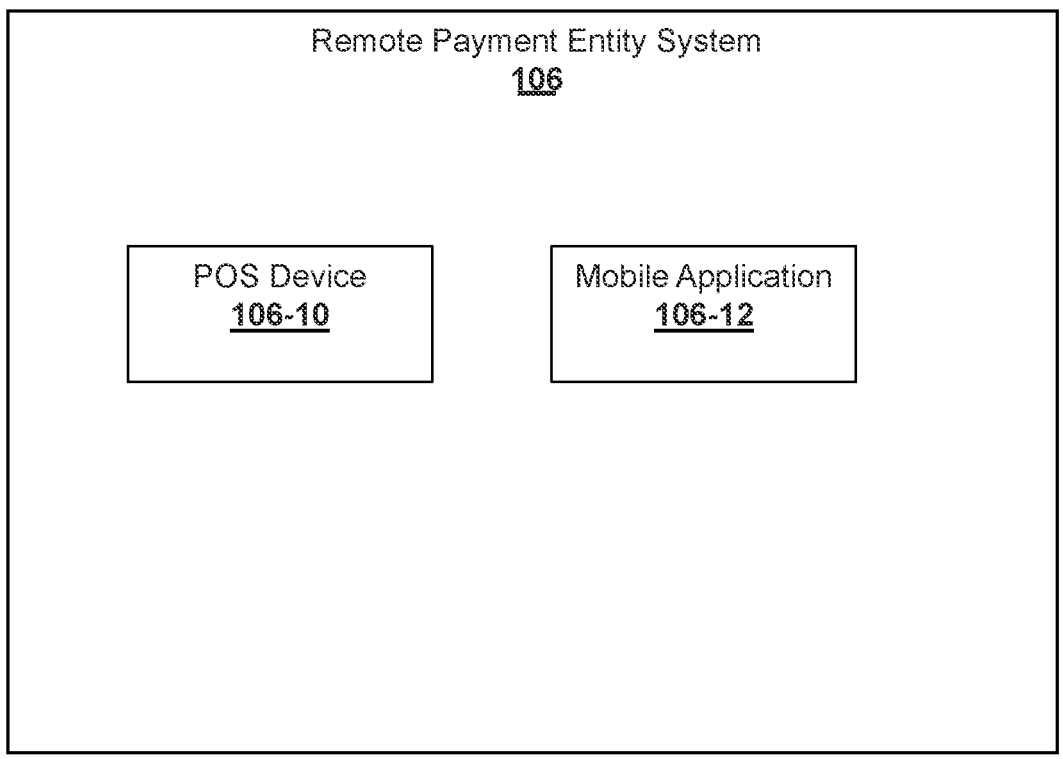
FIG. 1C is a diagram of a non-limiting embodiment or aspect of a remote payment entity system.

Referring now to FIG. 1C, FIG. 1C is a diagram of a non-limiting embodiment or aspect of remote payment entity system 106. For example, remote payment entity system 106 may include at least one POS device 106-10 capable of being in communication with user device 102, payment gateway system 108, acquirer system 110, transaction service provider system 112, and/or issuer system 114 via communication network 116. In another example, POS device 106-10 may communicate with user device 102 via a short-range wireless communication connection, via communication network 116, or via an application associated with user device 102.

In some non-limiting embodiments or aspects, remote payment entity system 106 may comprise a mobile application 106-12 capable of being in communication with user device 102, payment gateway system 108, acquirer system 110, transaction service provider system 112, and/or issuer system 114 via communication network 116. For example, mobile application 106-12 may allow communication via a short-range wireless communication connection. For example, mobile application 106-12 may communicate with user device 102 via a short-range wireless communication connection. In another example, mobile application 106-12 may communicate with user device 102 via communication network 116.

Figure 2:
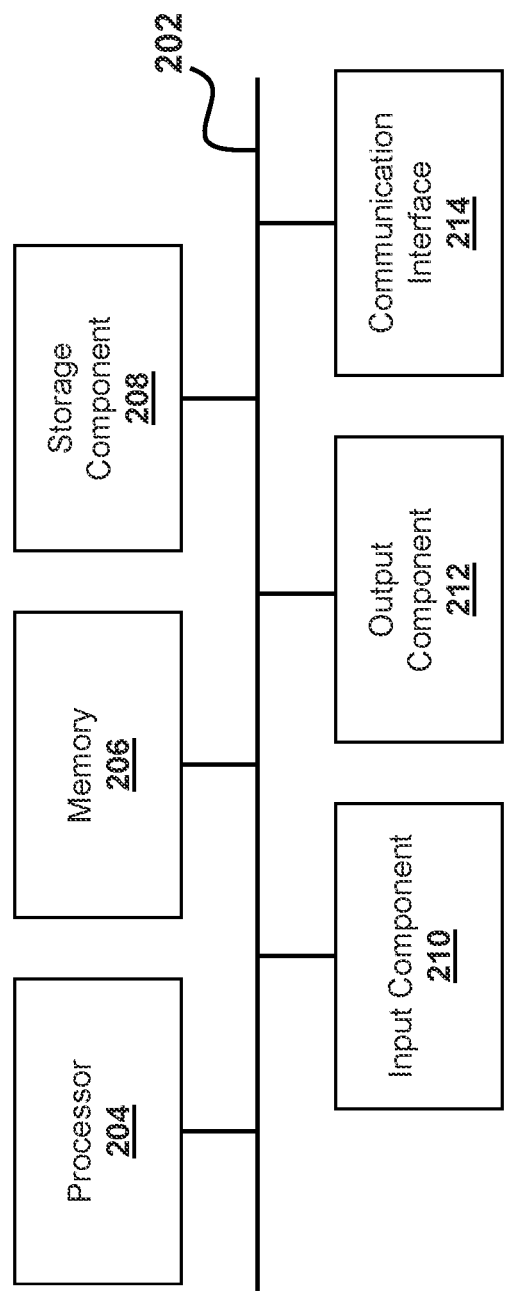
FIG. 2 is a diagram of a non-limiting embodiment or aspect of components of one or more devices and/or one or more systems of FIGS. 1A-1C.

Referring now to FIG. 2, FIG. 2 is a diagram of example components of device 200. Device 200 may correspond to user device 102, one or more devices of merchant system 104, one or more devices of remote payment entity system 106, one or more devices of payment gateway system 108, one or more devices of acquirer system 110, one or more devices of transaction service provider system 112, and/or one or more devices of issuer system 114. In some non-limiting embodiments or aspects, user device 102, one or more devices of merchant system 104, one or more devices of remote payment entity system 106, one or more devices of payment gateway system 108, one or more devices of acquirer system 110, one or more devices of transaction service provider system 112, and/or one or more devices of issuer system 114 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a fieldprogrammable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include clearing record data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
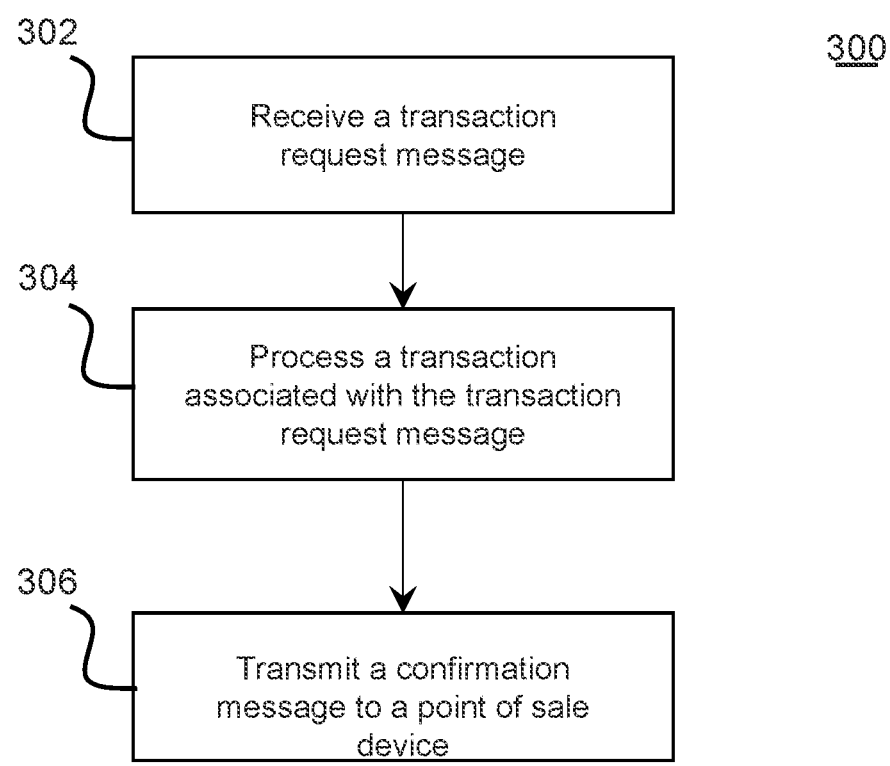
FIG. 3 is a flowchart of a non-limiting embodiment or aspect of a process for conducting a transaction involving a remote point of sale (POS) device.

Referring now to FIG. 3, FIG. 3 is a flowchart of a non-limiting aspect or embodiment of process 300 for conducting a transaction involving a remote POS device. In some non-limiting embodiments or aspects, one or more of the functions described with respect to process 300 may be performed (e.g., completely, partially, etc.) by payment gateway system 108. In some non-limiting embodiments or aspects, one or more of the steps of process 300 may be performed (e.g., completely, partially, and/or the like) by another device or a group of devices separate from and/or including payment gateway system 108, such as user device 102, merchant system 104, remote payment entity system, acquirer system 110, transaction service provider system 112, and/or issuer system 114.

As shown in FIG. 3, at step 302, process 300 may include receiving a transaction request message. For example, payment gateway system 108 may receive a transaction request message for a payment transaction involving a user associated with user device 102 and a merchant associated with merchant system 104. In some non-limiting embodiments, payment gateway system 108 may receive a transaction request message that is based on a message from a POS device of merchant system 104.

In some non-limiting embodiments, payment gateway system 108 may receive the transaction request message from remote payment entity system 106. For example, payment gateway system 108 may receive the transaction request message from a POS device of remote payment entity system 106. In another example, payment gateway system 108 may receive the transaction request message from a mobile application 106-12 (e.g., a server side mobile payment application) of remote payment entity system 106. In some non-limiting embodiments, remote payment entity system 106 (e.g., the POS device of remote payment entity system 106 or the mobile application of remote payment entity system 106) is associated with a first merchant.

In some non-limiting embodiments or aspects, the transaction request message may be associated with a payment transaction involving a user associated with user device 102 and a merchant (e.g., a second merchant that is different from a first merchant associated with remote payment entity system 106 or a second merchant that is the same as a first merchant associated with remote payment entity system 106) associated with merchant system 104. In some non-limiting embodiments, remote payment entity system 106 may be remote from merchant system 104. For example, remote payment entity system 106 may located at a merchant location (e.g., a store, kiosk, etc.) that is remote from a merchant location at which merchant system 104 is located.

In some non-limiting embodiments, remote payment entity system 106 may be associated with a first merchant and merchant system 104 may be associated with a second merchant. In some non-limiting embodiments, the second merchant may be associated with a second POS device that is remote (e.g., at a different merchant location) from a first POS device associated with the first merchant. In some non-limiting embodiments, the second POS device may be a component of merchant system 104. In some non-limiting embodiments, the first POS device may be a component of remote payment entity system 106.

In some non-limiting embodiments or aspects, the transaction request message may include data associated with an identifier of remote payment entity system 106. For example, the transaction request message may include an identifier (e.g., a second identifier) of the second POS device. In such an example, the transaction request message may include a unique identifier of the second POS device, such as an address (e.g., an Internet protocol (IP) address, a media access control (MAC) address, etc.), a name (e.g., a domain name, a network name, etc.), a label, and/or the like, of the second POS device. Additionally or alternatively, the transaction request message may include data associated with an identifier of merchant system 104. For example, the transaction request message may include an identifier (e.g., a first identifier) of the first POS device. In such an example, the transaction request message may include a unique identifier of the second POS device, such as an address (e.g., an IP address, a MAC address, etc.), a name (e.g., a domain name, a network name, etc.), a label, and/or the like, of the first POS device. Additionally or alternatively, the transaction request message may include transaction data associated with the payment transaction involving the user associated with user device 102 and the second merchant. For example, the transaction request message may include a transaction amount of the payment transaction, account data associated with an account (e.g., an account identifier of the account, such as an account number of the account, a token for the account, etc.) of the user, payment method data associated with a payment method (e.g., an identifier of a procedure for processing a payment transaction that involves a remote POS device, an indication that a procedure for processing a payment transaction that involves a remote POS device was selected, etc.) for processing of the payment transaction, and/or service fee data associated with a service fee to be charged to the account of the user based on processing of the payment transaction using the payment method.

In some non-limiting embodiments, merchant system 104 (e.g., a POS device of merchant system 104) and/or remote payment entity system 106 (e.g., a POS device of remote payment entity system 106, a mobile application of remote payment entity system 106, etc.) may generate the transaction request message.

In one example, remote payment entity system 106 may generate a transaction request message in response to receiving a message from user device 102. For example, POS device 106-10 of remote payment entity system 106 may generate the transaction request message. The message from user device 102 may include transaction data associated with the transaction. The transaction data may include an identifier of merchant system 104, account data associated with an account (e.g., an account identifier of the account, such as an account number of the account, a token for the account, etc.) of the user, and order amount (e.g. the price of the transaction). For example the transaction request message may include the transaction data. In another example, remote payment entity system 106 may generate a first transaction request message and a second transaction request message. The message from user device 102 may include transaction data associated with the transaction. For example, the first transaction request message may include an identifier of merchant system 104, account data associated with an account (e.g., an account identifier of the account, such as an account number of the account, a token for the account, etc.) of the user, and order amount (e.g. the price of the transaction). In another example, the transaction data associated with the transaction may be encoded as a machine-readable code. The machine-readable code may be generated by merchant system 104. The machine-readable code may be communicated via user device 102, communication network 116, etc. The second transaction request message may include an identifier of remote payment entity system 106, account data associated with an account (e.g., an account identifier of the account, such as an account number of the account, a token for the account, etc.) of the user, and service fee data (e.g. the price of the service fee). In one example, merchant system 104 may transmit the message to user device 102-1. User device 102-1 may transmit the message to user device 102-2 in response to receiving the message from merchant system 104. User device 102-2 may transit (e.g., via communication network 116) the message to remote payment entity system 106 in response to receiving the message from user device 102-1. For example, user device 102-2 may transmit the message to POS device 106-10 via a short-range wireless communication connection, via communication network 116, via an application associated with user device 102, etc. Remote payment entity system 106 may generate a transaction request message in response to receiving the message from user device 102-2. The transaction request message may comprise an identifier of merchant system 104, account data associated with an account (e.g., an account identifier of the account, such as an account number of the account, a token for the account, etc.) of the user, order amount (e.g. the price of the transaction), an identifier of remote payment entity system 106, payment method data associated with a payment method, and service fee amount.

In another example, remote payment entity system 106 may generate a transaction request message in response to receiving a message from user device 102. For example, mobile application 106-12 of remote payment entity system 106 may generate the transaction request message. The message from user device 102 may comprise an identifier of merchant system 104, account data associated with an account (e.g., an account identifier of the account, such as an account number of the account, a token for the account, etc.) of the user, and order amount (e.g. the price of the transaction). Merchant system 104 may transmit the message to user device 102-1. User device 102-1 may transmit the message to user device 102-2 in response to receiving the message from merchant system 104. User device 102-2 may transit the message to remote payment entity system 106 in response to receiving the message from user device 102-1. For example, user device 102-2 may transmit the message to mobile application 106-12 via a short-range wireless communication connection, via communication network 116, via an application associated with user device 102-2, etc. Remote payment entity system 106 may generate a transaction request message in response to receiving the message from user device 102-2. The transaction request message may comprise an identifier of merchant system 104, account data associated with an account (e.g., an account identifier of the account, such as an account number of the account, a token for the account, etc.) of the user, order amount (e.g. the price of the transaction), an identifier of remote payment entity system 106, payment method data associated with a payment method, and the service fee amount. In another example, remote payment entity system 106 may generate a transaction request message in response to receiving a message from a user. Merchant system 104 may transmit data associated with the transaction to the user. The data may comprise an identifier of merchant system 104 and order amount (e.g., price of the transaction). For example, the user may receive the data by reading from merchant system 104. For example, the user can read data by looking at a visual interface (e.g., a computer monitor) of POS device 104-1 of merchant system 104. The user may transmit the data to remote payment entity system 106 in response to receiving the data from merchant system 104. For example, the user may transmit the data by speaking with an operator of remote payment entity system 106. The operator may be a merchant operating merchant system 104 or an automated system operating remote payment entity system 106.

According to non-limiting embodiments or aspects, merchant system 104 may generate a transaction request message. For example, merchant system 104 may generate a transaction request message in response to receiving a message from user device 102. For example, POS device 104-1 of merchant system 104 may generate the transaction request message. The message from user device 102 may include account data associated with an account (e.g., an account identifier of the account, such as an account number of the account, a token for the account, etc.) of the user, and order amount (e.g. the price of the transaction). In another example, user device 102-1 may transmit the message to user device 102-2 in response to receiving the message from user device 102-1. User device 102-2 may transit the message to merchant system 104 in response to receiving the message from user device 102-1. For example, user device 102-2 may transmit the message to POS device 104-1 of merchant system 104 via a short-range wireless communication connection, via communication network 116, via an application associated with user device 102, etc. Merchant system 104 may generate a transaction request message in response to receiving the message from user device 102-2. The transaction request message may comprise an identifier of merchant system 104, account data associated with an account (e.g., an account identifier of the account, such as an account number of the account, a token for the account, etc.) of the user, order amount (e.g. the price of the transaction), payment method data associated with a payment method, and service fee amount.

As shown in FIG. 3, at step 304, process 300 may include processing a transaction associated with the transaction request message. For example, payment gateway system 108 may process the transaction associated with the transaction request message. In some non-limiting embodiments, payment gateway system 108 may process the transaction associated with the transaction request message by communicating with one or more entities in transaction processing network 101.

In some non-limiting embodiments, payment gateway system 108 may transmit a transaction authorization request message. In one example, payment gateway system 108 may generate a transaction authorization request message. Payment gateway system 108 may transmit the transaction authorization request message to acquirer system 110 based on receiving the transaction request message for a transaction. In some non-limiting embodiments, the transaction may be a payment transaction involving a user associated with user device 102 and a merchant (e.g., a second merchant that is different from a first merchant associated with remote payment entity system 106 or a second merchant that is the same as a first merchant associated with remote payment entity system 106) associated with merchant system 104.

In some non-limiting embodiments, the transaction authorization request message may include transaction data associated with the payment transaction involving the user associated with user device 102 and the second merchant. For example, transaction authorization request message may include a transaction amount of the payment transaction, account data associated with an account (e.g., an account identifier of the account, such as an account number of the account, a token for the account, etc.) of the user, payment method data associated with a payment method (e.g., an identifier of a procedure for processing a payment transaction that involves a remote POS device, an indication that a procedure for processing a payment transaction that involves a remote POS device was selected, etc.) for processing of the payment transaction, and/or service fee data associated with a service fee to be charged to the account of the user based on processing of the payment transaction using the payment method.

In some non-limiting embodiments, payment gateway system 108 may generate a first transaction authorization request message and a second transaction authorization request message. The first transaction authorization request message and the second transaction authorization request message may include transaction data associated with the payment transaction involving the user associated with user device 102 and the second merchant. For example, the first transaction authorization request message may include a transaction amount of the payment transaction, account data associated with an account (e.g., an account identifier of the account, such as an account number of the account, a token for the account, etc.) of the user, and/or payment method data associated with a payment method (e.g., an identifier of a procedure for processing a payment transaction that involves a remote POS device, and/or an indication that a procedure for processing a payment transaction that involves a remote POS device was selected, remote payment identifier, etc.) for processing of the payment transaction. The second transaction authorization request message may include account data associated with an account (e.g., an account identifier of the account, such as an account number of the account, a token for the account, etc.) of the user, payment method data associated with a payment method (e.g., an identifier of a procedure for processing a payment transaction that involves a remote POS device, an indication that a procedure for processing a payment transaction that involves a remote POS device was selected, etc.) for processing of the payment transaction, and/or service fee data associated with a service fee to be charged to the account of the user based on processing of the payment transaction using the payment method.

In some non-limiting embodiments or aspects, payment gateway system 108 determines the acquirer system to transmit the transaction request message. For example, payment gateway system 108 identifies the remote payment identifier in the transaction request message. Payment gateway system 108 determines that the transaction is a remote payment transaction based on the remote payment identifier. Payment gateway system 108 determines the appropriate acquirer system 110 to transmit the transaction request message based on the identifier of the merchant system in the transaction request message based on determining that the transaction is a remote payment transaction. For example, payment gateway system 108 determines the acquirer system 110 to transmit a transaction authorization request message. Payment gateway system 108 may transmit the transaction authorization request message to the acquirer system 110.

In some non-limiting embodiments or aspects, payment gateway system 108 determines a second acquirer system to transmit the transaction request message. For example, payment gateway system 108 identifies the remote payment identifier in the transaction request message. Payment gateway system 108 determines that the transaction is a remote payment transaction based on the remote payment identifier. Payment gateway system 108 determines the appropriate acquirer system 110 to transmit the transaction request message based on the identifier of the remote payment entity system 106 in the transaction request message based on determining that the transaction is a remote payment transaction. For example, payment gateway system 108 determines a second acquirer system to transmit a transaction authorization request message. Payment gateway system 108 may transmit the second transaction request message to the second acquirer system.

In some non-limiting embodiments or aspects, acquirer system 110 receives a transaction authorization request message from payment gateway system 108. For example, acquirer system 110 may transmit the transaction authorization request message to transaction service provider system 112 in response to receiving the transaction authorization request message from payment gateway system 108. For example, acquirer system 110 may transmit the first transaction authorization request message and the second transaction authorization request message to the transaction service provider system 112 in response to receiving the first transaction authorization request message and the second transaction authorization request message from payment gateway system 108.

In some non-limiting embodiments or aspects, transaction service provider system 112 may transmit the transaction authorization request message to issuer system 114. For example, transaction service provider system 112 may transmit the transaction authorization request message to issuer system 114 in response to receiving the transaction authorization request message from transaction service provider system 112. In another example, transaction service provider system 112 may transmit the first transaction authorization request message and the second transaction authorization request message to issuer system 114 in response to receiving the first transaction authorization request message and the second transaction authorization request message from acquirer system 110.

In some non-limiting embodiments or aspects, issuer system 114 may receive the transaction authorization request message from transaction service provider system 112. For example, issuer system 114 may determine whether to approve or deny the transaction authorization request message. Issuer system 114 may generate a transaction authorization response message based on determining whether to approve or deny the transaction authorization request message. In another example, issuer system 114 may receive the first transaction authorization request message and the second transaction authorization request message from transaction service provider system 112. Issuer system 114 may determine whether to approve or deny the first transaction authorization request message. Issuer system 114 may determine whether to approve or deny the second transaction authorization request message. Issuer system 114 may generate a first transaction authorization response message associated with merchant system 104 based on determining whether to approve or deny the first transaction authorization request message, and generate a second transaction authorization response message associated with remote payment entity system 106 based on determining whether to approve or deny the second transaction authorization request message.

In some non-limiting embodiments or aspects, issuer system 114 may transmit the transaction authorization response message to transaction service provider system 112. For example, transaction service provider system 112 may receive the transaction authorization response message from issuer system 114. In another example, transaction service provider system 112 may receive the first transaction authorization response message and the second transaction authorization response message from issuer system 114 in response to issuer system 114 transmitting the first transaction authorization response message and transmitting the second transaction authorization response message to transaction service provider system 112.

In some non-limiting embodiments or aspects, transaction service provider system 112 may transmit the transaction authorization response message to acquirer system 110. For example, acquirer system 110 may receive the transaction authorization response message from transaction service provider system 112. In another example, acquirer system 110 may receive the first transaction authorization response message and the second transaction authorization response message from the transaction service provider system 112.

In some non-limiting embodiments or aspects, acquirer system 110 may transmit the transaction authorization response message to payment gateway system 108. For example, payment gateway system 108 may receive the transaction authorization response message from acquirer system 110. In another example, payment gateway system 108 may receive the first transaction authorization response message and the second transaction authorization response message from acquirer system 110.

As shown in FIG. 3, at step 306, process 300 may include transmitting a confirmation message to a POS device. In some non-limiting embodiments or aspects, payment gateway system 108 may receive the transaction authorization response message from acquirer system 110. In some non-limiting embodiments, the transaction authorization response message is associated with a payment transaction involving a user associated with user device 102 and a merchant (e.g., a second merchant that is different from a first merchant associated with remote payment entity system 106 or a second merchant that is the same as a first merchant associated with remote payment entity system 106) associated with merchant system 104.

In some non-limiting embodiments, the transaction authorization response message may include an indication of whether the payment transaction is authorized. For example, the transaction authorization response message may include an indication that the payment transaction was authorized (e.g., authorized by issuer system 114) or not authorized (e.g., not authorized by issuer system 114). Additionally or alternatively, transaction authorization response message may include transaction data associated with the payment transaction involving the user associated with user device 102 and the second merchant. For example, the transaction authorization response message may include a transaction amount of the payment transaction, account data associated with an account (e.g., an account identifier of the account, such as an account number of the account, a token for the account, etc.) of the user, payment method data associated with a payment method (e.g., an identifier of a procedure for processing a payment transaction that involves a remote POS device, an indication that a procedure for processing a payment transaction that involves a remote POS device was selected, etc.) for processing of the payment transaction, and/or service fee data associated with a service fee to be charged to the account of the user based on processing of the payment transaction using the payment method.

In some non-limiting embodiments, the first transaction authorization response message and the second transaction authorization response message may include transaction data associated with the payment transaction involving the user associated with user device 102 and the second merchant. For example, the first transaction authorization response message may include a transaction amount of the payment transaction, account data associated with an account (e.g., an account identifier of the account, such as an account number of the account, a token for the account, etc.) of the user, payment method data associated with a payment method (e.g., an identifier of a procedure for processing a payment transaction that involves a remote POS device, and/or an indication that a procedure for processing a payment transaction that involves a remote POS device was selected, etc.) for processing of the payment transaction. The second transaction authorization response message may include account data associated with an account (e.g., an account identifier of the account, such as an account number of the account, a token for the account, etc.) of the user, payment method data associated with a payment method (e.g., an identifier of a procedure for processing a payment transaction that involves a remote POS device, an indication that a procedure for processing a payment transaction that involves a remote POS device was selected, etc.) for processing of the payment transaction, and/or service fee data associated with a service fee to be charged to the account of the user based on processing of the payment transaction using the payment method.

In some non-limiting embodiments or aspects, payment gateway system 108 may generate a confirmation message. For example, payment gateway system 108 may generate the confirmation message in response to receiving the transaction authorization response message from acquirer system 110. In such an example, payment gateway system 108 may generate the confirmation message in response to receiving the transaction authorization response message from acquirer system 110 if the transaction authorization response message includes an indication that the payment transaction was authorized (e.g., authorized by issuer system 114). In such an example, payment gateway system 108 may forego generating the confirmation message in response to receiving the transaction authorization response message from acquirer system 110 if the transaction authorization response message does not include an indication that the payment transaction was authorized (e.g., authorized by issuer system 114).

In some non-limiting embodiments or aspects, the confirmation message may include an indication that the payment transaction was authorized. Additionally or alternatively, the confirmation message may include a transaction amount of the payment transaction, account data associated with an account (e.g., an account identifier of the account, such as an account number of the account, a token for the account, etc.) of the user, payment method data associated with a payment method (e.g., an identifier of a procedure for processing a payment transaction that involves a remote POS device, an indication that a procedure for processing a payment transaction that involves a remote POS device was selected, etc.) for processing of the payment transaction, and/or service fee data associated with a service fee to be charged to the account of the user based on processing of the payment transaction using the payment method.

In some non-limiting embodiments or aspects, payment gateway system 108 may generate a first confirmation message in response to receiving the first transaction authorization response message from acquirer system 110 and generate a second confirmation message in response to receiving the second transaction authorization response message from acquirer system 110. For example, the first confirmation message may include a transaction amount of the payment transaction, account data associated with an account (e.g., an account identifier of the account, such as an account number of the account, a token for the account, etc.) of the user, payment method data associated with a payment method (e.g., an identifier of a procedure for processing a payment transaction that involves a remote POS device and/or an indication that a procedure for processing a payment transaction that involves a remote POS device was selected, etc.) for processing of the payment transaction. The second confirmation message may include account data associated with an account (e.g., an account identifier of the account, such as an account number of the account, a token for the account, etc.) of the user, payment method data associated with a payment method (e.g., an identifier of a procedure for processing a payment transaction that involves a remote POS device, an indication that a procedure for processing a payment transaction that involves a remote POS device was selected, etc.) for processing the payment transaction, and/or service fee data associated with a service fee to be charged to the account of the user based on processing of the payment transaction using the payment method.

In some non-limiting embodiments or aspects, payment gateway system 108 may transmit a confirmation message to a POS device. For example, payment gateway system 108 may transmit the confirmation message to remote payment entity system 106 in response to receiving the confirmation message from payment gateway system 108. For example, remote payment entity system 106 may transmit the confirmation message to POS device 106-10 of remote payment entity system 106. In another example, remote payment entity system 106 may transmit the confirmation message to mobile application 106-12 of remote payment entity system 106. In another example, payment gateway system 108 may transmit the confirmation message to merchant system 104. For example, payment gateway system 108 may transmit the confirmation to POS device 104-1 of merchant system 104.

In some non-limiting embodiments or aspects, payment gateway system 108 may transmit a first confirmation message and a second confirmation message to a POS device. For example, payment gateway system 108 may transmit the first confirmation message to remote payment entity system 106 in response to receiving the first confirmation message from payment gateway system 108. For example, remote payment entity system 106 may transmit the first confirmation message to POS device of 106-10 of remote payment entity system 106. In another example, remote payment entity system 106 may transmit the first confirmation message to mobile application 106-12 of remote payment entity system 106. In another example, payment gateway system 108 may transmit the second confirmation message to remote payment entity system 106 in response to receiving the second confirmation message from payment gateway system 108. For example, remote payment entity system 106 may transmit the second confirmation message to POS device of 106-10 of remote payment entity system 106. In another example, remote payment entity system 106 may transmit the first confirmation message to mobile application 106-12 of remote payment entity system 106. In another example, payment gateway system 108 may transmit the first confirmation message to merchant system 104 in response to receiving the first confirmation message from payment gateway system 108. For example, payment gateway system 108 may transmit the first confirmation message to POS device 104-1 of merchant system 104.

In some non-limiting embodiments or aspects, remote payment entity system 106 may transmit the confirmation message to merchant system 104. For example, remote payment entity system 106 may transmit the confirmation message to merchant system 104 in response to receiving the confirmation message from payment gateway system 108. For example, remote payment entity system 106 may transmit the confirmation message to POS device 104-1 of merchant system 104 in response to receiving the confirmation message from payment gateway system 108. For example, POS device 106-10 of remote payment entity system 106 may transmit the confirmation message to merchant system 104. For example, mobile application 106-12 of remote payment entity system 106 may transmit the confirmation message to merchant system 104.

In some non-limiting embodiments or aspects, remote payment entity system 106 may transmit the first confirmation message to merchant system 104. For example, remote payment entity system 106 may transmit the first confirmation message to merchant system 104 in response to receiving the first confirmation message from payment gateway system 108. For example, remote payment entity system 106 may transmit the first confirmation message to POS device 104-1 of merchant system 104 in response to receiving the first confirmation message from payment gateway system 108. For example, POS device 106-10 of remote payment entity system 106 may transmit the first confirmation message to merchant system 104. For example, mobile application 106-12 of remote payment entity system 106 may transmit the first confirmation message to merchant system 104.

Referring now to FIG. 4, FIG. 4 is a diagram of an exemplary implementation 400 of a non-limiting embodiment or aspect relating to process 300 as shown in FIG. 3. As shown in FIG. 4, implementation 400 may include merchant system 104, remote payment entity system 106, payment gateway system 108, and acquirer system 110. According to a non-limiting embodiment, these entities may be in communication with one another either directly or indirectly via communication network 116.

As shown by reference number 4002 in FIG. 4, merchant system 104 may transmit data associated with the transaction and identifier of merchant system 104 to remote payment entity system 106. According to a non-limiting embodiment, remote payment entity system 106 may receive data associated with the transaction and the identifier of the merchant system 104 from a purchaser device. In a further non-limiting embodiment, the purchaser device may receive data associated with the transaction and the identifier of merchant system 104 from merchant system 104. The data associated with the transaction may include a transaction amount and a service fee amount.

As shown by reference number 4004 in FIG. 4, remote payment entity system 106 processes the data associated with the transaction and the identifier of merchant system 104. Remote payment entity system 106 may transmit the data associated with the transaction and/or the identifier of merchant system 104 to payment gateway system 108. In another non-limiting embodiment, remote payment entity system 106 may transmit data associated with the transaction including a service fee and/or an identifier of remote payment entity system 106.

As shown by reference number 4006 in FIG. 4, in response to receiving data associated with the transaction, identifier of merchant system 104, and identifier of remote payment entity system 106, payment gateway system 108 may generate a transaction request message. The transaction request message may include data associated with the transaction, the identifier of merchant system 104, an identifier of remote payment entity system 106, and/or a remote payment identifier. In another non-limiting embodiment, payment gateway system 108 may generate a first transaction request message having data associated with the transaction including the transaction amount and the identifier of merchant system 104, and may generate a second transaction request message having data associated with the transaction including a service fee and the identifier of remote payment entity system 106.

As shown by reference number 4008 in FIG. 4, payment gateway system 108 may transmit the transaction request message to acquirer system 110. In another non-limiting embodiment, payment gateway system 108 may transmit the first transaction request message to acquirer system 110 and the second transaction request message to a second acquirer system. In response to receiving the transaction request message, acquirer system 110 and/or the second acquirer system may transmit the transaction request message to a transaction service provider system (e.g. transaction service provider system 112), which in turn may transmit the transaction request message to issuer system 114. In response receiving one or more transaction request messages, issuer system 114 may determine whether the transaction is approved or denied. After the determination, issuer system 114 may generate a transaction confirmation message. In another non-limiting embodiment, the issuer system may generate a first transaction confirmation message associated with the first transaction request message and a second transaction confirmation message associated with the second transaction request message. Issuer system 114 may transmit the first and second confirmation messages to transaction service provider system 112. In turn, transaction service provider system 112 may transmit the first confirmation message to acquirer system 110 and the second confirmation message to the second acquirer system.

As shown by reference number 4010 in FIG. 4, payment gateway system 108 may receive the transaction confirmation message from acquirer system 110. Alternatively, payment gateway system 108 may receive the first confirmation message from acquirer system 110 and the second transaction confirmation message from the second acquirer system.

As shown by reference number 4012 in FIG. 4, payment gateway system 108 may transmit the transaction confirmation message to remote payment entity system 106, which in turn may transmit the transaction confirmation message to merchant system 104, as shown in reference number 4014. In a non-limiting embodiment, payment gateway system 108 may transmit the first transaction confirmation message to merchant system 104 and the second transaction confirmation message to remote payment entity system 106. In a further non-limiting embodiment, payment gateway system 108 may forward the transaction confirmation message to remote payment entity system 106, which in turn may transmit the transaction confirmation message to merchant system 104.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method comprising:

receiving, with at least one processor of a payment gateway system, a transaction request message from a first payment point-of-sale device of a remote payment entity system, the first payment point-of-sale device in communication with a transaction processing network, the transaction request message associated with a transaction initiated between a user and a merchant system comprising a second payment point-of-sale device located remote from the first payment point-of-sale device while the second payment point-of-sale device is not in communication with the transaction processing network, wherein transaction data for the transaction is communicated from the second payment point-of-sale device to the first payment point-of-sale device, the transaction request message including an identifier of the merchant system, an identifier of the remote payment entity system, and transaction data associated with the transaction, the transaction data including a transaction amount and an account identifier;

generating, with the at least one processor of the payment gateway system, a first transaction request message for the transaction based on the transaction request message, the first transaction request message comprising the transaction amount and the identifier of the merchant system;

generating, with the at least one processor of the payment gateway system, a second transaction request message for the transaction based on the transaction request message, the second transaction request message comprising a fee amount and the identifier of the remote payment entity;

transmitting, with the at least one processor of the payment gateway system, the first transaction request message to a first acquirer system based on the identifier of the merchant system, wherein the first transaction request message is configured to cause the first acquirer system to transmit the first transaction request message to a transaction processing system, and wherein the transaction processing system is configured to transmit the first transaction request message to an issuer system corresponding to the account identifier used for the transaction;

transmitting, with the at least one processor of the payment gateway system, the second transaction request message to a second acquirer system based on the identifier of the remote payment entity system, wherein the second transaction request message is configured to cause the second acquirer system to transmit the second transaction request message to the transaction processing system, and wherein the transaction processing system is configured to transmit the second transaction request message to the issuer system;

receiving, with the at least one processor of the payment gateway system, a confirmation that the transaction was successful, wherein the issuer system is configured to determine whether to approve or deny the first transaction request message and the second transaction request message, and wherein the issuer system is configured to transmit the confirmation that the transaction was successful after determining to approve the first transaction request message and the second transaction request message; and in response to receiving the confirmation, transmitting, with the at least one processor of the payment gateway system, a first confirmation message to the remote payment entity and a second confirmation message to the merchant system.

2. The method of claim 1, further comprising:

receiving, with the at least one processor of the payment gateway system, a first transaction request message comprising the identifier of the merchant system; and receiving, with the at least one processor of the payment gateway system, a second transaction request message comprising the identifier of the remote payment entity system and the identifier of the merchant system.

3. The method of claim 2, wherein the second transaction request message further comprises service fee data associated with a service fee, the service fee data comprising the fee amount.

4. The method of claim 1, wherein a transaction authorization response message comprises a first transaction authorization response message associated with the merchant system and a second transaction authorization response message associated with the remote payment entity system.

5. The method of claim 1, further comprising:

receiving, with a user device, the transaction data associated with the transaction and the identifier of the merchant system from the merchant system, transmitting, with the user device, the transaction data associated with the transaction and the identifier of the merchant system to a second user device; and generating, with at least one processor of the remote payment entity system, the transaction request message, in response to receiving the transaction data associated with the transaction and the identifier of the merchant system from the second user device.

6. The method of claim 5, wherein the transaction data associated with the transaction and the identifier of the merchant system are encoded as a machine-readable code, and wherein the machine-readable code is generated by the merchant system and communicated by the user device to the second user device.

7. The method of claim 1, wherein the transaction request message further comprises a remote payment identifier, and wherein processing the transaction comprises:

determining that the transaction is a remote payment transaction based on the remote payment identifier; and determining whether to transmit the transaction request message to the first acquirer system or the second acquirer system based on the identifier of the merchant system, in response to determining that the transaction is a remote payment transaction.

8. A system comprising:

at least one processor of a payment gateway system in communication with at least one data storage device and an electronic payment processing network, the at least one processor programmed or configured to:

receive a transaction request message from a first payment point-of-sale device of a remote payment entity system, the first payment point-of-sale device in communication with a transaction processing network, wherein the transaction request message is associated with a transaction initiated between a user and a merchant system comprising a second payment point-of-sale device located remote from the first payment point-of-sale device while the second payment point-of-sale device is not in communication with the transaction processing network, wherein transaction data for the transaction is communicated from the second payment point-of-sale device to the first payment point-of-sale device, the transaction request message including an identifier of the merchant system, an identifier of the remote payment entity system, and transaction data associated with the transaction, the transaction data including a transaction amount and an account identifier;

generate a first transaction request message for the transaction based on the transaction request message, the first transaction request message comprising the transaction amount and the identifier of the merchant system;

generate a second transaction request message for the transaction based on the transaction request message, the second transaction request message comprising a fee amount and the identifier of the remote payment entity;

transmit the first transaction request message to a first acquirer system based on the identifier of the merchant system, wherein the first transaction request message is configured to cause the first acquirer system to transmit the first transaction request message to a transaction processing system, and wherein the transaction processing system is configured to transmit the first transaction request message to an issuer system corresponding to the account identifier used for the transaction;

transmit the second transaction request message to a second acquirer system based on the identifier of the remote payment entity system, wherein the second transaction request message is configured to cause the second acquirer system to transmit the second transaction request to the transaction processing system, and wherein the transaction processing system is configured to transmit the second transaction request message to the issuer system;

receive a confirmation that the transaction was successful, wherein the issuer system is configured to determine whether to approve or deny the first transaction request message and the second transaction request message, and wherein the issuer system is configured to transmit the confirmation that the transaction was successful after determining to approve the first transaction request message and the second transaction request message; and in response to receiving the confirmation, transmit a first confirmation message to the remote payment entity and a second confirmation message to the merchant system.

9. The system of claim 8, further comprising:
at least one data storage device comprising a database including a plurality of identifiers corresponding to a plurality of merchant systems, each identifier of the plurality of identifiers associated with at least one acquirer system.

10. The system of claim 8, wherein the at least one processor is further programmed or configured to process the transaction request message to:

receive a first transaction request message comprising the identifier of the merchant system; and receive a second transaction request message comprising the identifier of the remote payment entity system and the identifier of the merchant system.

11. The system of claim 10, wherein the second transaction request message further comprises service fee data associated with a service fee, the service fee data comprising the fee amount.

12. The system of claim 8, wherein a transaction authorization response message comprises a first transaction authorization response message associated with the merchant system and a second transaction authorization response message associated with the remote payment entity system.

13. The system of claim 8, wherein the at least one processor of the payment gateway system is further programmed or configured to:

receive, with a user device, the transaction data associated with the transaction and the identifier of the merchant system from the merchant system;

transmit, with the user device, the transaction data associated with the transaction and the identifier of the merchant system to a second user device; and generate, with the remote payment entity system, the transaction request message, in response to receiving the transaction data associated with the transaction and the identifier of the merchant system from the second user device.

14. The system of claim 13, wherein the transaction data associated with the transaction and the identifier of the merchant system are encoded as a machine-readable code, and wherein the machine-readable code is generated by the merchant system and communicated by the user device to the second user device.

15. The system of claim 8, wherein the transaction request message further comprises a remote payment identifier, and wherein the at least one processor of the payment gateway system is further programmed or configured to:

determine that the transaction is a remote payment transaction based on the remote payment identifier; and determine whether to transmit the transaction request message to the first acquirer system or the second acquirer system based on the identifier of the merchant system, in response to determining that the transaction is a remote payment transaction.

16. A computer program product comprising at least one non-transitory computer-readable medium including program instructions that, when executed by at least one processor of a payment gateway system, cause the at least one processor of the payment gateway system to:

receive a transaction request message from a first payment point-of-sale device of a remote payment entity system, the first payment point-of-sale device in communication with a transaction processing network, wherein the transaction request message is associated with a transaction initiated between a user and a merchant system comprising a second payment point-of-sale device located remote from the first payment point-of-sale device while the second payment point-of-sale device is not in communication with the transaction processing network, wherein transaction data for the transaction is communicated from the second payment point-of-sale device to the first payment point-of-sale device, the transaction request message including an identifier of the merchant system, an identifier of the remote payment entity system, and transaction data associated with the transaction, the transaction data including a transaction amount and an account identifier;

generate a first transaction request message for the transaction based on the transaction request message, the first transaction request message comprising the transaction amount and the identifier of the merchant system;

generate a second transaction request message for the transaction based on the transaction request message, the second transaction request message comprising a fee amount and the identifier of the remote payment entity;

transmit the first transaction request message to a first acquirer system based on the identifier of the merchant system, wherein the first transaction request message is configured to cause the first acquirer system to transmit the first transaction request message to a transaction processing system, and wherein the transaction processing system is configured to transmit the first transaction request message to an issuer system corresponding to the account identifier used for the transaction;

transmit the second transaction request message to a second acquirer system based on the identifier of the remote payment system, wherein the second transaction request message is configured to cause the second acquirer system to transmit the second transaction request message to the transaction processing system, and wherein the transaction processing system is configured to transmit the second transaction request message to the issuer system;

receive a confirmation that the transaction was successful, wherein the issuer system is configured to determine whether to approve or deny the first transaction request message and the second transaction request message, and wherein the issuer system is configured to transmit the confirmation that the transaction was successful after determining to approve the first transaction request message and the second transaction request message; and in response to receiving the transaction, transmit a first confirmation message to the remote payment entity system and a second confirmation message to the merchant system.

17. The computer program product of claim 16, further causing the at least one processor of the payment gateway system to:

generate a first transaction request message comprising the identifier of the merchant system; and generate a second transaction request message comprising the identifier of the remote payment entity system.

* * * * *